United States Patent
Maung et al.

(10) Patent No.: US 10,922,255 B2
(45) Date of Patent: Feb. 16, 2021

(54) EMBEDDED UNIVERSAL SERIAL BUS 2 REPEATER

(71) Applicant: TEXAS INSTRUMENTS INCORPORATED, Dallas, TX (US)

(72) Inventors: Win Naing Maung, Plano, TX (US); Douglas Edward Wente, Murphy, TX (US); Mustafa Ulvi Erdogan, Allen, TX (US); Huanzhang Huang, Plano, TX (US); Saurabh Goyal, Bangalore (IN); Bhupendra Sharma, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/939,725

(22) Filed: Jul. 27, 2020

(65) Prior Publication Data

US 2020/0356507 A1    Nov. 12, 2020

Related U.S. Application Data

(63) Continuation of application No. 16/404,494, filed on May 6, 2019, now Pat. No. 10,762,016.

(Continued)

(51) Int. Cl.
*G06F 13/42* (2006.01)
*G06F 13/38* (2006.01)
*H04B 3/36* (2006.01)

(52) U.S. Cl.
CPC ........ *G06F 13/382* (2013.01); *G06F 13/4282* (2013.01); *H04B 3/36* (2013.01); *G06F 2213/0042* (2013.01)

(58) Field of Classification Search
CPC ............... G06F 13/382; G06F 13/4282; G06F 2213/0042; H03G 3/344; H03G 3/34; H04B 3/36
See application file for complete search history.

(56) References Cited

U.S. PATENT DOCUMENTS

| 7,400,173 B1 | 7/2008 | Kwong et al. |
| 7,443,211 B2 | 10/2008 | Liu |

(Continued)

OTHER PUBLICATIONS

Compaq Computer Corporation et al., "Universal Serial Bus Specification," Revision 2.0, Apr. 27, 2000, 350 p., in 9 parts. [Online: https://www.usb.org/document-library/usb-20-specification].

(Continued)

*Primary Examiner* — David S Huang
(74) *Attorney, Agent, or Firm* — John R. Pessetto; Charles A. Brill; Frank D. Cimino

(57) ABSTRACT

Aspects of the disclosure provide for a circuit including a squelch detector having a first input coupled to a first node and configured to receive a positive component of a differential signal with a floating center tap, a second input coupled to a second node and configured to receive a negative component of the differential signal, and an output coupled to a logic circuit, a first resistor coupled between the first node and a third node, a second resistor coupled between the third node and the second node, a third resistor coupled between the first node and a fourth node, a fourth resistor coupled between the fourth node and the second node, a capacitor coupled between the fourth node and a ground terminal, a comparator having a first input coupled to the third node, a second input coupled to a fifth node, and an output coupled to the logic circuit.

4 Claims, 3 Drawing Sheets

Related U.S. Application Data

(60) Provisional application No. 62/724,888, filed on Aug. 30, 2018.

(56) References Cited

U.S. PATENT DOCUMENTS

| | | | |
|---|---|---|---|
| 8,332,563 | B2 | 12/2012 | Sobelman |
| 9,130,817 | B2 | 9/2015 | Yang |
| 10,333,473 | B1 | 6/2019 | Shen et al. |
| 2007/0173216 | A1 | 7/2007 | Blum |
| 2010/0329391 | A1 | 12/2010 | Fukuda et al. |
| 2010/0332695 | A1 | 12/2010 | Fukuda et al. |
| 2011/0063010 | A1* | 3/2011 | Namkoong .... H03K 19/018528 327/306 |
| 2013/0029622 | A1* | 1/2013 | Zhan ............... H03G 3/344 455/218 |
| 2015/0227489 | A1 | 8/2015 | Chen et al. |
| 2016/0162427 | A1 | 6/2016 | Kang et al. |
| 2016/0162430 | A1 | 6/2016 | Ma et al. |
| 2016/0380747 | A1 | 12/2016 | Low et al. |
| 2017/0277249 | A1 | 9/2017 | Low et al. |
| 2018/0173666 | A1 | 6/2018 | Srivastava |
| 2019/0288743 | A1 | 9/2019 | Wang et al. |

OTHER PUBLICATIONS

Compaq Computer Corporation, "USB 2.0 Adopters Agreement," Apr. 14, 2011, 6 p. [Online: https://www.usb.org/document-library/usb-20-specification].

Compaq Comuputer Corporation et al., "Errata for 'USB Revision 2.0 Apr. 27, 2000' as of Dec. 7, 2000," 31 p. [Online: https://www.usb.org/document-library/usb-20-specification].

Compaq Comuter Corporation et al., "USB 2.0 Specification Engineering Change Notice (ECN) #1: Mini-B Connector," Oct. 20, 2000, 45 p. [Online: https://www.usb.org/document-library/usb-20-specification].

Compaq Computer Corporation et al., "Pull-Up/Pull-Down Resistors," USB Engineering Change Notice, 5 p. [Online: https://www.usb.org/document-library/usb-20-specification].

Compaq Computer Corporation et al., "Errata for 'USB Revision 2.0 Apr. 27, 2000' as of May 28, 2002," 7 p. [Online: https://www.usb.org/document-library/usb-20-specification].

Compaq Computer Corporation et al., "Interface Association Descriptors," USB Engineering Change Notice, 5 p. [Online: https://www.usb.org/document-library/usb-20-specification].

Compaq Computer Corporation et al., "Rounded Chamfer," Engineering Change Notice, Oct. 8, 2003, 3 p. [Online: https://www.usb.org/document-library/usb-20-specification].

Compaq Computer Corporation et al., "Unicode UTF-16LE for String Descriptors," USB Engineering Change Notice, Feb. 21, 2005, 2 p. [Online: https://www.usb.org/document-library/usb-20-specification].

Compaq Computer Corporation et al., "Inter-Chip USB Supplement to the USB 2.0 Specification," Revision 1.0, Mar. 13, 2006, 48 p. [Online: https://www.usb.org/document-library/usb-20-specification].

Compaq Computer Corporation et al., "Device Class Specification Adopters Agreement," Apr. 4, 2007, 5 p. [Online: https://www.usb.org/document-library/usb-20-specification].

Compaq Computer Corportion et al., "USB 2.0 Link Power Management Addendum," Engineering Change Notice, Jul. 16, 2007, 29 p. [Online: https://www.usb.org/document-library/usb-20-specification].

Compaq Computer Corporation et al., "High- Speed Inter-Chip USB Electrical Specification," Version 1.0, Sep. 23, 2007, 16 p. [Online: https://www.usb.org/document-library/usb-20-specification].

Compaq Computer Corporation et al., "Suspend Current Limit Changes," USB Engineering Change Notice, Apr. 9, 2008, 2 p. [Online: https://www.usb.org/document-library/usb-20-specification].

Compaq Computer Corporation et al., "5V Short Circuit Withstand Requirement Change," USB Engineering Change Notice, Dec. 22, 2008, 2 p. [Online: https://www.usb.org/document-library/usb-20-specification].

Compaq Computer Corporation et al., "Device Capacitance," USB Engineering Change Notice, Dec. 22, 2008, 2 p. [Online: https://www.usb.org/document-library/usb-20-specification].

Compaq Computer Corporation et al., "Material Change," USB Engineering Change Notice, Dec. 22, 2008, 3 p. [Online: https://www.usb.org/document-library/usb-20-specification].

Compaq Computer Corporation et al., "USB 2.0 Phase-Locked SOFs," USB Engineering Change Notice, Dec. 22, 2008, 2 p. [Online: https://www.usb.org/document-library/usb-20-specification].

Compaq Computer Corporation et al., "USB 2.0 DC Resistance," USB Engineering Change Notice, Dec. 22, 2008, 8 p. [Online: https://www.usb.org/document-library/usb-20-specification].

Compaq Computer Corporation et al., An Examination of the Effect of Power to Signal & of Signal to Power (Supplement for XV-4687C), Dec. 2, 2009, 15 p. [Online: https://www.usb.org/document-library/usb-20-specification].

Compaq Computer Corporation et al., "Clarification on the Chamfer on USB 2.0 Micro Connectors," USB Engineering Change Notice, Mar. 23, 2010, 4 p. [Online: https://www.usb.org/document-library/usb-20-specification].

Compaq Computer Corporation et al., "Maximum Un-Mating Force Value Definition to Micro Connector USB 2.0," Mar. 23, 2010, 3 p. [Online: https://www.usb.org/document-library/usb-20-specification].

Compaq Computer Corporation et al., "'On-The-Go Supplement to the USB 2.0 Specification' Adopters Agreement," May 26, 2009, 1 p. [Online: https://www.usb.org/document-library/usb-20-specification].

Compaq Computer Corporation et al., "USB Test_Mode Selector Values," USB Engineering Change Notice, Jul. 26, 2010, 3 p. [Online: https://www.usb.org/document-library/usb-20-specification].

Compaq Computer Corporation et al., "Errata for USB 2.0 ECN: Link Power Management (LPM)—Jul. 2007," Sep. 28, 2011, 8 p. [Online: https://www.usb.org/document-library/usb-20-specification].

Compaq Computer Corporation et al., "On-The-Go and Embedded Host Supplement to the USB Revision 2.0 Specification," Revision 2.0 version 1.1a, Jul. 27, 2012, 96 p., in 2 parts. [Online: https://www.usb.org/document-library/usb-20-specification].

Compaq Computer Corporation et al., "HSIC ECN," USB Engineering Change Notice, May 21, 2012, 6 p. [Online: https://www.usb.org/document-library/usb-20-specification].

Compaq Computer Corporation et al., USB 2.0 Connect Timing Update, USB Engineering Change Notice, Apr. 4, 2013, 6 p. [Online: https://www.usb.org/document-library/usb-20-specification].

Compaq Computer Corporation et al., "Disconnect Supplement to High Speed Inter Chip Specification," Revision 1.0, Sep. 18, 2013, 8 p. [Online: https://www.usb.org/document-library/usb-20-specification].

Compaq Computer Corporation et al., "USB 2.0 VBUS Max Limit," Aug. 11, 2014, 5 p. [Online: https://www.usb.org/document-library/usb-20-specification].

Compaq Computer Corporation et al., "Maximum Vbus Voltage," Nov. 26, 2014, 4 p. [Online: https://www.usb.org/document-library/usb-20-specification].

"Quad Type Cable Additional for Micro USB," 3 p.

"MicroUSB Micro-B ID Pin Resistance and Tolerance Stack-Up between D+ and D−," USB Engineering Change Notice, 2 p.

Compaq Computer Corporation et al., Universal Serial Bus Micro-USB Cables and Connectors Specification, Revision 1.01, Apr. 4, 2007, 36 p.

Fujikura Ltd., "ECN Proposal for Micro-USB Cables," Aug. 15, 2008, 23 p.

Compaq Computer Corporation et al., "On-The-Go and Embedded Host Supplement to the USB Revision 2.0 Specification," Revision 2.0, version 1.1a, Jul. 27, 2012, 96 p., in 2 parts.

Apple Inc. et al., Embedded USB2 (eUSB2) Physical Layer Supplement to the USB Revision 2.0 Specification, Revision 1.1, Copyright 2018 Apple Inc. et al., 164 p., in 2 parts.

International Search Report in corresponding PCT Application No. PCT/US2019/045326, dated Oct. 24, 2019 (2 pages).

International Search Report in corresponding PCT Application No. PCT/US2019/047877, dated Nov. 21, 2019 (2 pages).

(56) References Cited

OTHER PUBLICATIONS

International Search Report in corresponding PCT Application No. PCT/US2019/043334, dated Feb. 27, 2020 (2 pages).

* cited by examiner

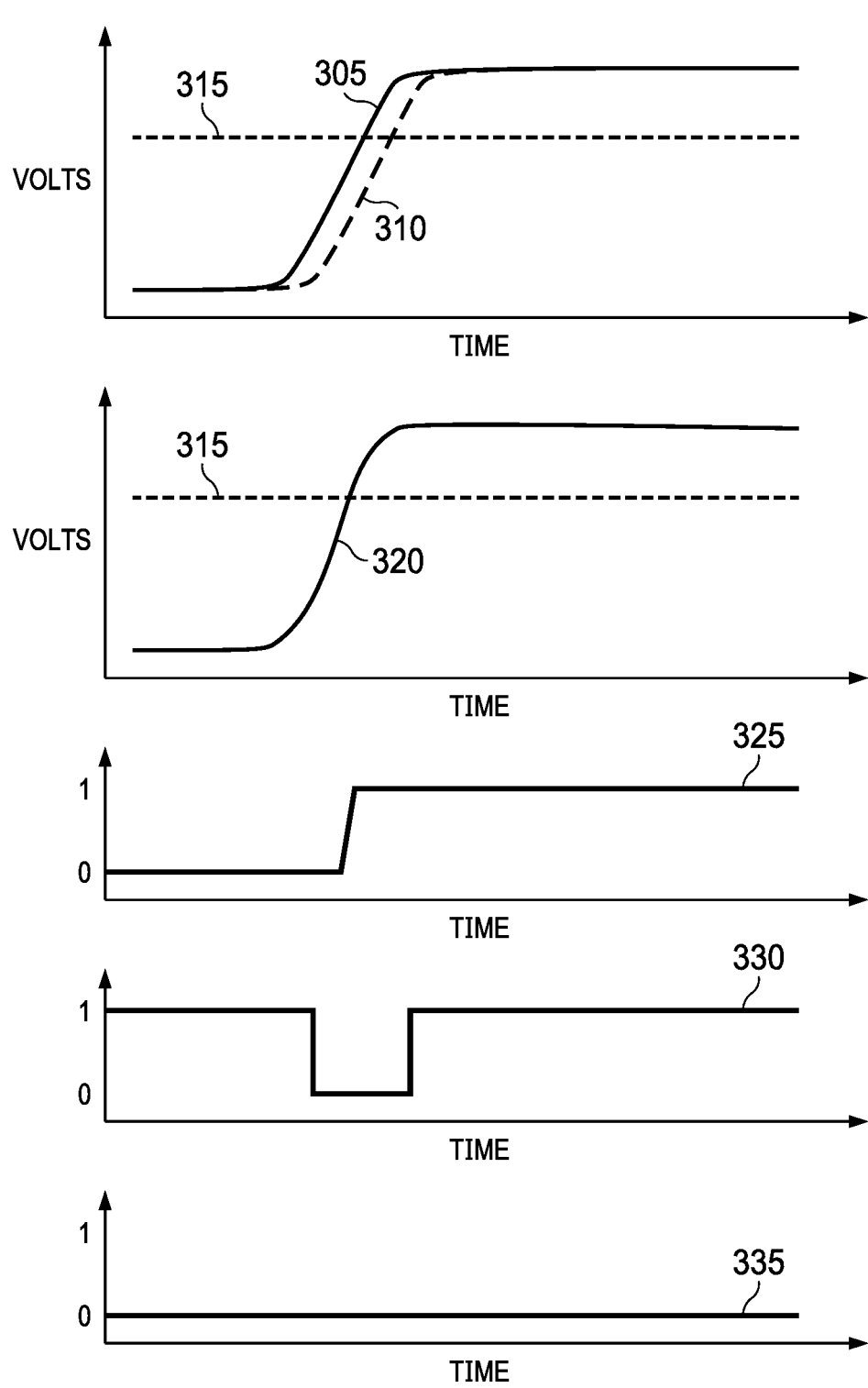

EMBEDDED UNIVERSAL SERIAL BUS 2 REPEATER

CROSS-REFERENCE TO RELATED APPLICATIONS

This continuation application claims priority to U.S. patent application Ser. No. 16/404,494, filed May 6, 2019, which application claims priority to and the benefit of U.S. Provisional Patent Application No. 62/724,888, filed Aug. 30, 2018, both of which are incorporated herein by reference in their entirety.

SUMMARY

Aspects of the present disclosure provide for a circuit. In at least some examples, the circuit includes a first amplifier, a second amplifier, a third amplifier, a squelch detector, a first resistor, a second resistor, a comparator, and a logic circuit. The first amplifier has a first input coupled to a first node, a second input coupled to a second node, a first output, and a second output. The second amplifier has a first input coupled to the first output of the first amplifier, a second input coupled to the second output of the first amplifier, a first output, and a second output. The third amplifier has a first input coupled to the first output of the second amplifier, a second input coupled to the second output of the second amplifier, a control input, a first output coupled to a third node, and a second output coupled to a fourth node. The squelch detector has a first input coupled to the first node, a second input coupled to the second node, and an output. The first resistor is coupled between the first node and a fifth node. The second resistor is coupled between the fifth node and the second node. The comparator has a first input coupled to the fifth node, a second input coupled to a sixth node, and an output. The logic circuit has a first input coupled to the output of the squelch detector, a second input coupled to the output of the comparator, and an output coupled to the control input of the third amplifier.

Other aspects of the present disclosure provide for a circuit. In at least some examples, the circuit includes a squelch detector, a first resistor, a second resistor, a third resistor, a fourth resistor, a first capacitor, a comparator, and a logic circuit. The squelch detector has a first input coupled to a first node, a second input coupled to a second node, and an output, wherein the first node is configured to receive a positive component of a differential input signal with a floating center tap, and wherein the second node is configured to receive a negative component of the differential input signal with the floating center tap. The first resistor is coupled between the first node and a third node. The second resistor is coupled between the third node and the second node. The third resistor is coupled between the first node and a fourth node. The fourth resistor is coupled between the fourth node and the second node. The first capacitor is coupled between the fourth node and a ground terminal. The comparator has a first input coupled to the third node, a second input coupled to a fifth node, and an output. The logic circuit has a first input coupled to the output of the squelch detector, a second input coupled to the output of the logic circuit, and an output.

Other aspects of the present disclosure provide for a method. In at least some examples, the method includes receiving, at a circuit, data via an idle differential signal line, performing a squelch detection on the differential signal line, determining a value of a common mode voltage (Vcm) with reference to a reference voltage (VREF) by performing a comparison, and verifying a result of the squelch detection with a result of the comparison.

BRIEF DESCRIPTION OF THE DRAWINGS

For a detailed description of various examples, reference will now be made to the accompanying drawings in which:

FIG. 3 shows a diagram of illustrative signal waveforms in accordance with various examples.

DETAILED DESCRIPTION

Figure 1:
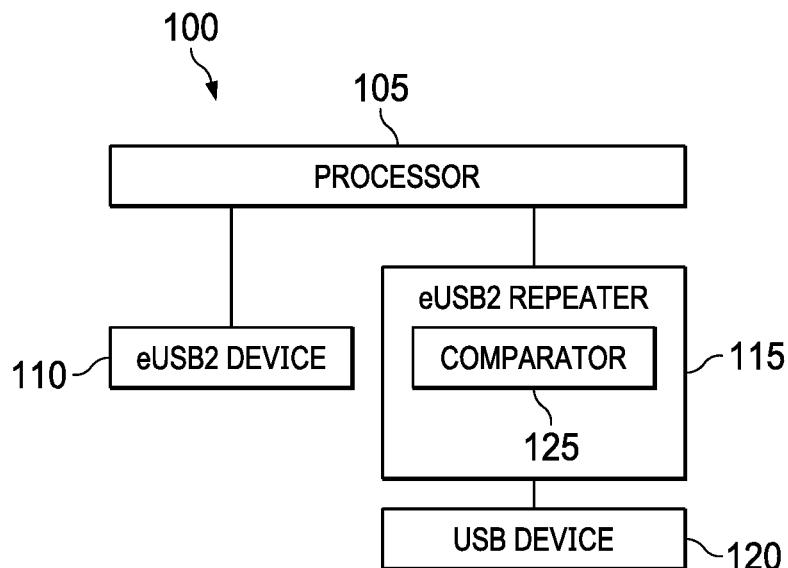
FIG. 1 shows a block diagram of an illustrative system in accordance with various examples.

Universal Serial Bus (USB) is a standard establishing specifications for interconnect cabling, connectors, and communication protocols. As referred to herein, USB refers to any version of the USB specification, including any amendments or supplements, certified by the USB Implementers Forum (USB IF) or any suitable body who replaces and/or aids the USB IF in its role overseeing the USB specification, whether now existing or later developed. In at least one example, USB, as referred to herein, encompasses any one or more of the USB 1.0 specification, USB 2.0 specification, USB 3.0 specification, USB 4.0 specification, or any derivatives thereof, such as amended or ".x" variations of the above specifications. Also, as referred to herein, legacy USB refers to USB 2.x and/or USB 1.x. Embedded USB (eUSB), in at least some examples, refers to eUSB22. While reference is made herein to eUSB2, in various examples the teachings of the present disclosure are further applicable to other versions of eUSB2 that are extensions of, alternatives to, derivatives of, or otherwise share at least some commonalities with, or similarities to, eUSB2. Accordingly, while eUSB2 is referred to herein in an exemplary manner, the present disclosure is, in some examples, not limited to implementation in an eUSB2 environment, in an eUSB2 environment, or in a USB environment.

At its inception, USB was primarily intended for implementation in specifying standards for connection and communication between personal computers and peripheral devices. However, as adoption of the USB standard has expanded and implementation in computing devices of support for the USB standard has gained in popularity, efforts have been made to extend and expand the applicability of USB. For example, while initially establishing specifications for communications between personal computers and peripheral devices, USB has expanded to communication between peripheral devices, between personal computers, and other use cases. As a result of such widespread implementation and use of USB, efforts are being further made to utilize USB as a communication protocol among individual subsystems or circuits (e.g., such as a system-on-a-chip (SoC)). Such implementations are sometimes referred to as eUSB2. New challenges arise in implementing eUSB2. For example, at a circuit level, computing devices often operate at voltage levels that vary from those of conventional USB, creating an impediment between direct communication between eUSB2 and legacy USB systems. To mitigate this impediment, an eUSB2 repeater operates as a bridge or non-linear redriver between eUSB2 and legacy USB systems, or vice versa, to translate between legacy USB signaling voltage levels that are customarily about 3.3 volts (V) and eUSB2 signaling voltages levels that are circuit-level (e.g., silicon appropriate voltages) such as about 1.0 V, 1.2 V, or any other suitable value less than 3.3 V. In at least some examples, the signaling voltage levels are determined according to values of a supply voltage for a respective system. For example, a legacy USB system is powered by a 3.3 V, or any other suitable value, supply voltage and an eUSB2 system is powered by 1.0 V or 1.2 V, or any other suitable value, voltage supply.

When eUSB2 differential signal lines are idle, in some examples, single-ended signaling is permitted over one or both of the differential signal lines (e.g., such that instead of one differential signal being sent over the differential signal lines, two single-ended signals are sent over the differential signal lines). Additionally, in some examples, a single-ended signaling is used to enter, or exit, from various modes of differential signaling. For example, some eUSB2 systems include a low-speed operation mode and a high-speed operation mode. When the eUSB2 system is operating in the high-speed operation mode, in some examples, a single-ended logical high signal (e.g., a signal having a value of about 1 V) is transmitted on each of the differential signal lines to indicate an exit from the high-speed operation mode. Under ideal conditions, the single-ended logical high signal is transmitted substantially simultaneously on each of the differential signal lines to prevent the single-ended signals from appearing as differential input. However, in actual application environments, skew often exists between the single-ended logical high signals such that, for at least some period of time, the single-ended logical high signal is asserted and present on one of the differential signal lines but a single-ended logical high signal is not asserted and present on another of the differential signal lines. The skew is caused, in various examples, from non-ideal operation of a transmitter transmitting the single-ended logical high signal over the differential signal lines, delay introduced by various couplings associated with the differential signal lines, propagation delay of the differential signal lines, etc. For a period of time between the single-ended logical high signal being present on one of the differential signal lines and the single-ended logical high signal becoming present on the other of the differential signal lines, in some examples, the differential signal lines appear to a device, such as an eUSB2 repeater, to be the beginning of data communication (e.g., such as the beginning of a high-speed packet or a start of packet (SOP) indicator), which is contrary to the intended operation of exiting the high-speed mode of operation. Accordingly, in at least some examples, the skew between the single-ended logical high signals on the differential signal lines causes erroneous detections and/or operations of a device receiving the single-ended logical high signals. The erroneous detections (such as erroneous detection of the skewed single-ended logical high signals as a differential signal), in some examples, cause the erroneous operations (such as an output corresponding to the received inputs being undefined and an unknown signal, potentially affecting a down-stream device that receives the output).

In some eUSB2 repeater implementations, a clock data recovery (CDR) circuit or a phase locked loop (PLL) determines clock timing information of a signal received by the eUSB2 repeater and, based on that clock timing information, the eUSB2 repeater reconstructs a received signal for subsequent transmission. Knowledge of this clock information, in at least some examples, enables compensation for skew in signals, thereby preventing, or at least partially mitigating, the erroneous detections and/or operations of a device, a discussed above. However, both a CDR circuit and a PLL are comparatively large components of an eUSB2 repeater in terms of footprint (e.g., physical surface area of a component die) with respect to a remainder of the eUSB2 repeater, increasing both cost to manufacture the eUSB2 repeater and power consumed by the eUSB2 repeater. In at least some aspects, goals of implementation of eUSB2 include providing communication according to the USB specifications in smaller, lower-power environments than legacy USB, which runs contrary to the size and power requirements of both the CDR circuit and the PLL. Accordingly, it at least some eUSB2 repeater implementations it is desirable to accurately detect receipt of skewed single-ended logical high signals as opposed to a differential input signal (e.g., such as a high-speed SOP indicator) to provide for accurate operation of the eUSB2 repeater.

At least some aspects of the present disclosure provide for a circuit. The circuit is, in some examples, suitable for use in interfacing between eUSB2 and USB interfaces. Particularly, in at least some examples the circuit is an eUSB2 to USB repeater. In other examples, the circuit is a USB to eUSB2 repeater. For example, the circuit provides level-shifting from eUSB2 voltage levels to USB voltage levels and/or from USB voltage levels to eUSB2 voltage levels. As such, in at least some examples the circuit is viewed as a buffer and/or a level-shifter. In some examples, the circuit further provides support for one or more elements of USB communication, such as accurate detection of both a high-speed SOP indicator and a pair of skewed single-ended logical high signals. For example, the circuit detects a difference in voltages present on differential signal lines via a squelch detector (e.g., determining whether a differential exceeding a threshold amount exists between a value of a signal present on one of the differential signal lines and a value of a signal present on another of the differential signal lines). Conventionally, when the squelch detector detects that the differential signal lines are unsquelched (the differential between the value of the signal present on one of the differential signal lines and the value of the signal present on another of the differential signal lines exceeds the threshold), the differential signal lines are active and data is being received and the squelch detector outputs a logical low signal. When the differential signal lines are squelched (the differential between the value of the signal present on one of the differential signal lines and the value of the signal present on another of the differential signal lines does not exceed the threshold), the differential signal lines are idle and the squelch detector outputs a logical high signal. Thus, to the squelch detector, when skewed single-ended logical high signals are received, a period of time between receipt of a rising edge transition of a first of the single-ended logical high signals and a receipt of a rising edge transition of a second of the single-ended logical high signals appears as active differential signal lines receiving differential data.

To prevent inaccurate operation due to an output of the squelch detector seemingly indicating the existence of differential input data, the circuit verifies and/or validates the output of the squelch detector based on a common mode voltage (Vcm) of the differential signal lines. For example, when Vcm exceeds a threshold, a comparator of the circuit outputs a logical high signal. When Vcm does not exceed the threshold, the comparator outputs a logical low signal. The threshold is, in some examples, determined according to a highest Vcm that is not intended to be detected as a single-ended logical high signal and a lowest output low voltage of an upstream device transmitting on the differential signal lines. When the squelch detector outputs a logical low signal and the comparator outputs a logical low signal, the circuit determines, such as through one or more logic components, that a differential input signal (such as a high-speed SOP indicator) is being received. When the squelch detector outputs a logical low signal and the comparator outputs a logical high signal, the circuit determines that the output of the squelch detector is an erroneous indication of differential data input and instead single-ended logical high signals are being received via the differential signal lines. When the squelch detector outputs a logical high and the comparator outputs a logical low signal, the circuit determines that data is not being received by the circuit. When the squelch detector outputs a logical high and the comparator outputs a logical high signal, the circuit determines that single-ended logical high signals are being received via the differential signal lines. In at least some examples, the common mode comparator additionally facilitates detection of an absence of a high speed differential input signal when receiving single ended one which, in some examples, renders a squelch detector ineffective and prone to erroneous detection resulting from Vcm of the input signal exceeding a valid common mode range for the squelch detector.

Turning now to FIG. 1, a block diagram of an illustrative system 100 is shown. In at least some examples, the system 100 is illustrative of a computing device, or elements of a computing device. For example, the system 100 includes a processor 105, an eUSB2 device 110, an eUSB2 repeater 115, and a USB device 120. The USB device 120 is a legacy USB device, as described elsewhere herein. In some examples, one or both of the eUSB2 device 110 or the USB device 120 is implemented external to the system 100 and configured to couple to the system 100 through an appropriate interface (e.g., such as a port and receptacle suitable for performing communication according to eUSB2 or USB protocol, respectively). The processor 105 is, in some examples, a SoC. The eUSB2 device 110 is any device operating in both ingress and egress communication directions according to signal voltage level specifications for eUSB2. The USB device 120 is any device operating in both ingress and egress communication directions according to signal voltage level specifications for legacy USB. For example, in at least some implementations the USB device 120 is a peripheral such as a user input device, (e.g., a sensor, a scanner, an imaging device, a microphone, etc.), an output device (e.g., a printer, speakers, etc.), a storage device, or any other peripheral, component, or device suitable for communicating with the processor 105.

The eUSB2 repeater 115 communicatively couples the processor 105 to the USB device 120 and vice versa, converting signals appropriate for the processor 105 to signals appropriate for the USB device 120 and vice versa. For example, in some implementations signaling in the processor 105 is performed in a range of about 0.8 V to about 1.4 V. Similarly, in some implementations signaling in the USB device 120 is performed at about 3.3 V or about 5 V. In at least some examples, the eUSB2 repeater 115 operates as a bit-level repeater, receiving signals from one of the processor 105 or USB device 120 and converting the signals for use by the other of the processor 105 or USB device 120 (e.g., by shifting a voltage level of the signals upward or downward based on a direction of the communications). In some examples, a data packet communicated in the system 100 begins with an SOP indicator.

In at least some examples, differential eUSB2 input signal communication lines of the eUSB2 repeater 115 transition from an idle state to an active state when the eUSB2 repeater 115 receives the SOP indicator via the differential eUSB2 input signal lines. In other examples, while the differential eUSB2 input signal lines remain in the idle state single-ended communication is permitted on each individual line of the differential eUSB2 input signal lines. In at least some examples, data communicated via the single-ended communication is used to control operation of the eUSB2 repeater 115. For example, while the eUSB2 repeater 115 is operating in a high-speed mode of operation, receipt of single-ended logical high signals via each individual line of the differential eUSB2 input signal lines indicates and/or commands an exit from the high-speed mode of operation to a low-speed mode of operation. In some examples, the single-ended logical high signals are skewed, as discussed above, and the skewed single-ended logical high signals appears to the eUSB2 repeater 115 as similar to a beginning of high-speed data communication. This, in at least some examples, causes the eUSB2 repeater 115 to not interpret the single-ended logical high signals as an instruction to exit the high-speed mode of operation and therefore causing the eUSB2 repeater 115 to remain in the high-speed mode of operation and, in some examples, erroneously activating a receiver and/or transmitter of the eUSB2 repeater 115, propagating erroneous data and/or a glitch to the USB device 120.

Accordingly, in at least some examples the eUSB2 repeater 115 includes a comparator 125 that is configured to determine whether signals present on the differential eUSB2 input signal lines are components of a differential signal or are single-ended communications. In at least some examples, the determination is made according to Vcm of the signals present on the differential eUSB2 input signal lines. In some examples, the comparator 125 does not itself determine whether the signals present on the differential eUSB2 input signal lines are components of a differential signal or are single-ended communications. Instead, the comparator 125 provides an output signal to another component of the eUSB2 repeater 115, such as a logic circuit (not shown), that makes the determination of whether the signals present on the differential eUSB2 input signal lines are components of a differential signal or are single-ended communications based on any one or more signals including at least the output of the comparator 125.

Figure 2:
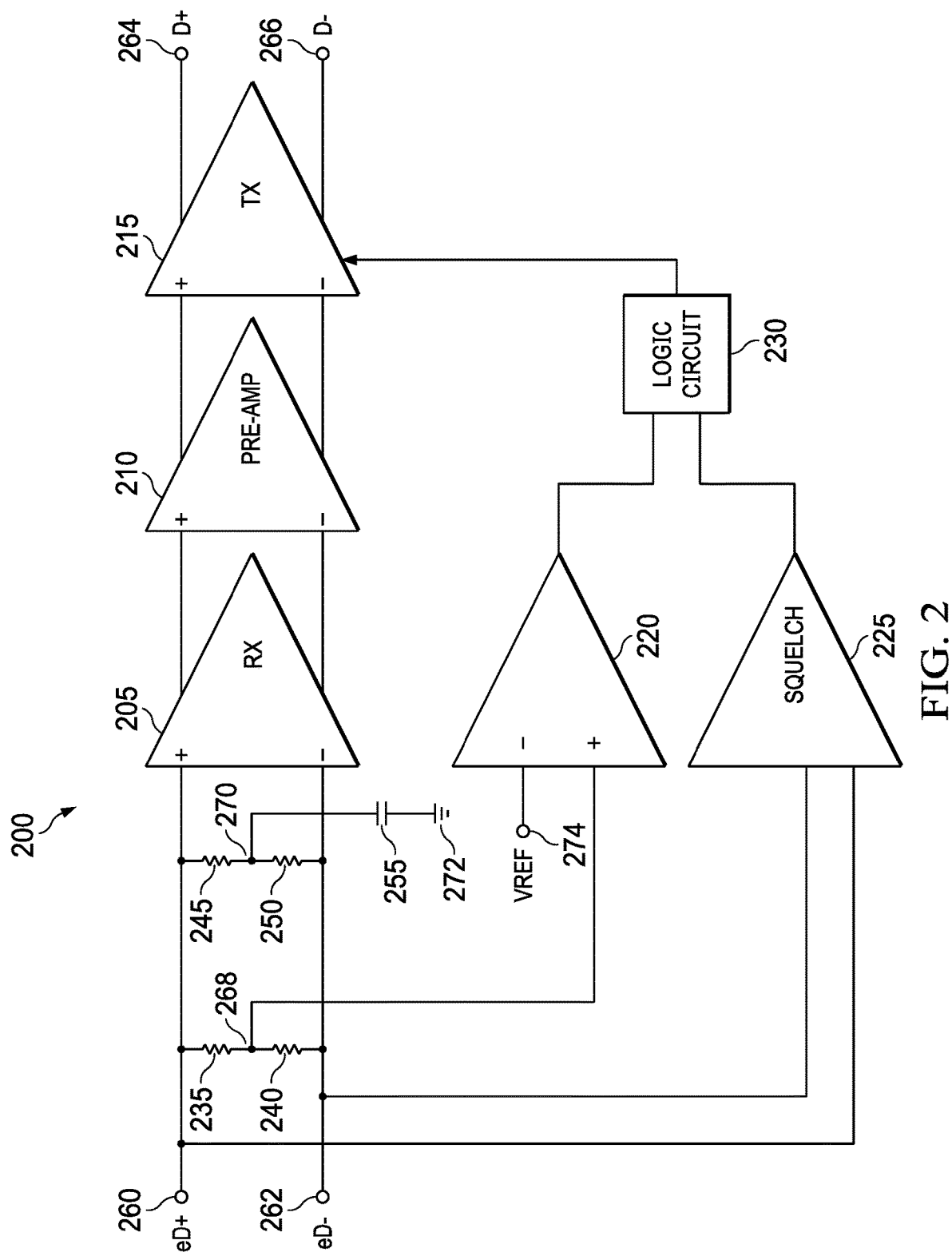
FIG. 2 shows a schematic diagram of an illustrative circuit in accordance with various examples.

Turning now to FIG. 2, a schematic diagram of an illustrative circuit 200 is shown. In at least some examples, the circuit 200 is suitable for implementation as the eUSB2 repeater 115 of the system 100 of FIG. 1. The circuit 200, in some examples, is representative of an eUSB2 repeater having functionality to receive data from an eUSB2 system and provide data to a legacy USB system. The circuit 200, in at least some examples, includes an amplifier 205, an amplifier 210, an amplifier 215, a comparator 220, a squelch detector 225, a logic circuit 230, a resistor 235, a resistor 240, a resistor 245, a resistor 250, and a capacitor 255. In at least some examples, the amplifier 205 is considered a receiver (RX) of the circuit 200, the amplifier 210 is considered a pre-amplifier (Pre-Amp) of the circuit 200, and the amplifier 215 is considered a transmitter (TX) of the circuit 200. In at least some examples, the amplifier 210 is omitted from the circuit 200. In at least some examples, the circuit 200 expressly does not include a CDR circuit or a PLL.

In an example architecture of the circuit 200, the amplifier 205 has a positive differential input coupled to a node 260 and a negative differential input coupled to a node 262. The amplifier 210 has a positive differential input coupled to a negative differential output of the amplifier 205 and a negative differential input coupled to negative differential output of the amplifier 205. The amplifier 215 has a positive differential input coupled to a positive differential output of the amplifier 210, a negative differential input coupled to a negative differential output of the amplifier 210, a positive differential output coupled to a node 264, and a negative differential output coupled to a node 266. The comparator 220 has a first input coupled to a node 268 and a second input coupled to a node 274. The squelch detector 225 has a first input coupled to the node 260 and a second input coupled to the node 262. An output of the comparator 220 and an output of the squelch detector 225 are each coupled to respective inputs of the logic circuit 230. An output of the logic circuit 230 is coupled to a control terminal of the amplifier 215. The resistor 235 is coupled between the node 260 and the node 268 and the resistor 240 is coupled between the node 268 and the node 262. The resistor 245 is coupled between the node 260 and the node 270 and the resistor 250 is coupled between the node 270 and the node 262. The capacitor 255 is coupled between the node 270 and a ground terminal 272.

In an example of operation of the circuit 200, a differential input signal is received at the node 260 and the node 262. For example, a positive component of the differential input signal (eD+) is received at the node 260 and a negative component of the differential input signal (eD−) is received at the node 262. In this regard, in at least some examples the node 260 and the node 262 collectively comprise differential eUSB2 input ports and/or differential eUSB2 input signal lines of the circuit 200. The amplifier 205 amplifies the differential input signal and the amplifier 210 amplifies a result of that amplification, and the amplifier 215 in turn amplifies a result of that second amplification to provide a differential output signal at the node 264 and the node 266, respectively. A positive component of the differential output signal (D+) is output at the node 264 and a negative component of the differential output signal (D−) is output at the node 266. In this regard, in at least some examples the node 264 and the node 266 collectively comprise differential USB output ports and/or differential USB output signal lines of the circuit 200. In at least some examples, the amplifier 215 is powered by a different power source and/or receives a different supply voltage than the amplifier 205, for example, such that the circuit 200 uses a dual-supply to provide level-shifting functionality between the differential eUSB2 input ports and the differential USB output ports. Additionally, in at least some examples the amplifier 215 is subject to control of the logic circuit 230. For example, the logic circuit 230 controls when the amplifier 215 is active, amplifying signals provided by the amplifier 210 to provide the differential output signal at the node 264 and the node 266, respectively, or when the amplifier 215 is turned off and is not amplifying signals provided by the amplifier 210 to provide the differential output signal at the node 264 and the node 266, respectively.

Each of the resistor 235, resistor 240, resistor 245, and resistor 250 have approximately a same resistance value such that they are balanced and a voltage present at the node 268 is approximately equal to Vcm of eD+ and eD−. Additionally, a center tap of eUSB2 differential signaling lines is floating, meaning the center tap is not referenced to a ground potential. Accordingly, a voltage present at the node 270 is approximately equal to Vcm_ref based on Vcm and a voltage (Vc) of the capacitor 255. In at least some examples, the capacitor 255 has a capacitance of about 50 picofarads (pF) to create the floating center tap between eD+ and eD−.

The comparator 220 is configured to compare Vcm of eD+ and eD− to a reference voltage (VREF) received at the node 274. In at least some examples, VREF has a value determined according to a value for representing a logical high signal in single-ended signaling via the differential eUSB2 input signal lines and a value of Vcm for high-speed differential signaling via the differential eUSB2 input signal lines. For example, VREF is greater than the value of Vcm for high-speed differential signaling via the differential eUSB2 input signal lines and is less than the value for representing a logical high signal in single-ended signaling via the differential eUSB2 input signal lines. In at least some examples, VREF has a value of about 700 millivolts (mV). In other examples, VREF has a value of about 500 mV, about 400 mV, or any other suitable voltage greater than Vcm of the high-speed differential signals. When Vcm is greater than VREF, the comparator 220 outputs a signal having a logical high value. When Vcm is less than VREF, the comparator 220 outputs a signal having a logical low value.

The squelch detector 225, in at least some examples, outputs a logic high value signal when a differential between eD+ and eD− exceeds a threshold (e.g., a squelch threshold) and outputs a logical low value signal when the differential between eD+ and eD− is less than the threshold. Accordingly, in at least some examples an output of the squelch detector 225 indicates whether differential data is being received by the circuit 200.

In some examples, the squelch detector 225 outputs a false positive, for example, erroneously indicating that differential data is being received by the circuit 200. For example, when the differential eUSB2 input signal lines are idle, eUSB2 specification permits single-ended communication via an ingress communication line that carries eD+ and single-ended communication via an ingress communication line that carries eD−. In some examples, this single-ended communication signals to the circuit 200 a mode of operation to enter or exit. For example, when the circuit 200 is operating in a high-speed mode of operation and single-ended signals representing logical high values are received at both the node 260 and the node 262, the circuit 200 is controlled to exit the high-speed mode of operation and return to the low-speed mode of operation. However, because of propagation delay, transmitter non-idealities, noise, interference, and/or any other various sources of signal delay, in various examples the logical high values of the single-ended signals do not reach the node 260 and the node 262 at the same time. In at least some examples, this results in the single-ended signals at the node 260 and the node 262 being skewed. The skewed single-ended signals appear to the squelch detector 225 as differential data. For example, rather than a transition to a logical high value occurring at the node 260 and at the node 262 simultaneously, in some examples there is a delay at one of the node 260 or the node 262 that creates the skew. For the period of time of that delay, the squelch detector 225 outputs a logical high signal indicating that differential input data is being received, resulting from the differential voltage present between the node 260 and the node 262 exceeding the squelch threshold. However, when the single-ended signals are being received at the node 260 and the node 262, the differential eUSB2 input signal lines are still considered to be idle because differential data is not being received. Therefore, the output of the squelch detector 225, for the period of time of the delay between the transition to a logical high value occurring at the node 260 and at the node 262, erroneously indicates that differential data is being received. The logic circuit 230, however, does not have knowledge of the erroneous nature of the indication received from the squelch detector 225 from the signal received from the squelch detector 225 itself.

Instead, the logic circuit 230 additionally receives the output of the comparator 220. The output of the comparator 220, in at least some examples, verifies or disproves the output of the squelch detector 225. For example, when differential data is being received at the node 260 and the node 262, in at least some examples, the comparator 220 outputs a logical low signal (e.g., such as when high-speed differential data is received having an ideal Vcm of about 200 mV, which is less than VREF). Conversely, when differential data is not being received at the node 260 and the node 262, but instead one or more single-ended signals are being received, the comparator 220 outputs a logical high signal. For example, a single-ended logical high signal in eUSB2 systems, in at least some examples, has a value of about 1 V, causing Vcm present between the node 260 and the node 262 at the node 268 to be greater than VREF.

When the output of the squelch detector 225 is a logical high signal and the output of the comparator 220 is a logical low signal, the output of the comparator 220 verifies the output of the squelch detector 225 (e.g., indicating that Vcm is not greater than VREF). However, when the output of the squelch detector 225 is a logical high signal and the output of the comparator 220 is a logical high signal, the output of the comparator 220 disproves the output of the squelch detector 225. For example, because VREF is greater than Vcm of differential data input, and the logical high output of the comparator 220 indicates that Vcm is greater than VREF, then Vcm is greater than the Vcm of differential data input and single-ended signals are being received by the circuit 200 at the node 260 and/or the node 262.

When the output of the squelch detector 225 is a logical low signal and the output of the comparator 220 is a logical low signal, either the output of the comparator 220 verifies the output of the squelch detector 225 or the logical low value single-ended signals are being received by the circuit 200. When the output of the squelch detector 225 is a logical low signal and the output of the comparator 220 is a logical high signal, the output of the comparator 220 verifies the output of the squelch detector 225, indicating that differential input is not being received by the circuit 200 but instead the circuit 200 is receiving single-ended signals.

Based on the output of the comparator 220 and the squelch detector 225, the logic circuit 230 determines whether single-ended signals are being received or whether differential input signals are being received. Additionally, the logic circuit 230 controls the amplifier 215 based on the determination of whether single-ended signals are being received or differential input signals are being received. For example, the logic circuit controls when the amplifier 215 is active or the amplifier 215 is inactive, as discussed above such that the amplifier 215 remains inactive when the single-ended signals are being received and becomes active when the differential input signals are being received.

Turning now to FIG. 3, a diagram 300 of illustrative signal waveforms is shown. In at least some examples, the diagram 300 corresponds to at least some signal waveforms present in the circuit 200. For example, a signal 305 corresponds to eD+, a signal 310 corresponds to eD−, a signal 315 corresponds to VREF, a signal 320 corresponds to Vcm, a signal 325 corresponds to an output of the comparator 220, a signal 330 corresponds to an output of the squelch detector 225, and a signal 335 corresponds to a control signal output by the logic circuit 230 to control enabling or disabling of the amplifier 215 (e.g., control whether signals are being transmitted by the circuit 200 via the node 264 and the node 266).

As shown by diagram 300, when the signal 305 and the signal 310 are each pulled high, in some examples skew exists between the signals such that, for a period of time, a non-zero differential voltage exists between the signal 305 and the signal 310. As further shown by the signal 330, in some examples this non-zero differential voltage exceeds a squelch threshold, causing the squelch detector 225 to trigger, indicating that a differential signal is being received for the period of time over which the non-zero differential voltage exceeds the squelch threshold. In the absence of the comparator 220 and operation of the circuit 200 according to the present disclosure, in some examples, the signal 335 would include a rising edge at substantially a same time as the falling edge of the signal 330 and would include a falling edge at substantially a same time as the rising edge of the signal 330, creating a positive pulse in the signal 335. This pulse in the signal 335 would cause the amplifier 215 to activate and transmit data erroneously during a duration of time of the pulse. The transmitted data is, in at least some examples, referred to as a glitch and is undesirable in operation of the circuit 200. However, by inclusion of the comparator 220 and operation of the circuit 200 according to the present disclosure, the glitch is at least mitigated, if not prevented.

For example, as shown by the signal 325, when a value of the signal 320 exceeds a value of the signal 315, a rising edge occurs in the signal 325 and the signal 325 maintains a high value until the value of the signal 320 no longer exceeds the value of the signal 315. When the signal 325 has the high value, the signal 335 is held at a low value by the logic circuit 230, as discussed elsewhere herein, without respect to a value of the signal 330. In this way, a glitch in an transmission of the amplifier 215 is mitigated and/or prevented.

Figure 4:
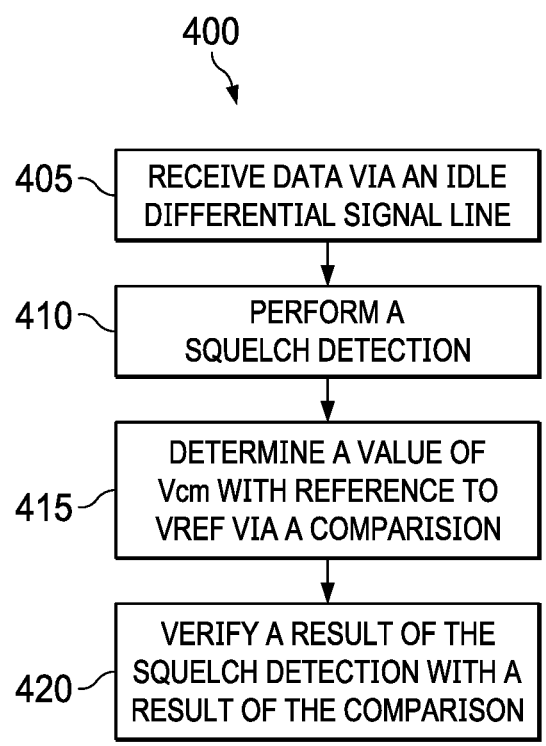
FIG. 4 shows a flowchart of an illustrative method in accordance with various examples.

Turning now to FIG. 4, a flowchart of an illustrative method 400 is shown. In at least some examples, the method 400 corresponds to actions performed by one or more components of the system 100 and/or the circuit 200. The method 400 is, in some examples, a method for controlling a circuit, such as an eUSB2 repeater. Implementation of the method 400 by a circuit, in at least some examples, is advantageous in accurately determining whether a circuit is receiving differential data (e.g., high-speed data, such as a high-speed SOP indicator), single-ended signals, or no signals, without the use of a CDR circuit or PLL.

At operation 405, data is received via an idle differential signal line. In at least some examples, the idle differential signal line is defined as both positive and negative lines of the differential signal line being weakly held to a ground potential. The data is, in some examples, one or more single-ended signals (e.g., signals that are communicated entirely via one line of a differential signal line without regard or reference to a signal present on another line of the differential signal line). For example, between receipt of high speed packets, the differential signal lines are in the idle state. In some examples, this is referred to as a single-ended zero. When data transmission is complete, an upstream device indicates an exit from high speed mode by pulling both positive and negative lines of the differential signal line high (e.g., nominally to about 1.0 V or 1.2 V), which in some examples is referred to as a single-ended one SE1.

At operation 410, a squelch detection is performed. The squelch detection is performed, in some examples, by a squelch detector. The squelch detector detects a difference between a signal present on one line of the differential input signal and a signal present on another line of the differential input signal and, when the difference exceeds a squelch threshold, outputs a squelch detection result as a logical low signal to indicate that the differential signal line is carrying differential data.

At operation 415, a value of Vcm with reference to VREF is determined. The value of Vcm with reference to VREF is determined, in some examples, by a comparator. When Vcm exceeds VREF, the comparator outputs a comparison result as a logical high signal. When Vcm is less than Vref, the comparator outputs the comparison result as a logical low signal. In at least some examples, VREF has a value determined according to a value for representing a logical high signal in single-ended signaling via the differential signal line and a value of Vcm for high-speed differential signaling via the differential signal line. For example, VREF is greater than the value of Vcm for high-speed differential signaling via the differential signal line and is less than the value for representing a logical high signal in single-ended signaling via the differential signal line.

At operation 420, the output of the squelch detector is verified against the output of the comparator (e.g., with a result of the comparison performed by the comparator). When the output of the squelch detector is a logical low signal and the output of the comparator is a logical low signal, the output of the comparator verifies the output of the squelch detector (e.g., indicating that Vcm is not greater than VREF). However, when the output of the squelch detector is a logical low signal and the output of the comparator is a logical high signal, the output of the comparator disproves the output of the squelch detector. For example, because VREF is greater than the Vcm of differential data input, and the logical high output of the comparator indicates that Vcm is greater than VREF, then Vcm is greater than the Vcm of differential data input and single-ended signals are being received.

When the output of the squelch detector is a logical high signal and the output of the comparator is a logical low signal, either the output of the comparator verifies the output of the squelch detector or the logical low value single-ended signals are being received by the circuit. When the output of the squelch detector is a logical high signal and the output of the comparator is a logical high signal, the output of the comparator verifies the output of the squelch detector, indicating that differential input is not being received but instead single-ended signals are being received.

While the operations of the method 400 have been discussed and labeled with numerical reference, in various examples the method 400 includes additional operations that are not recited herein (e.g., such as intermediary comparisons, logical operations, output selections such as via a multiplexer, etc.), in some examples any one or more of the operations recited herein include one or more sub-operations (e.g., such as intermediary comparisons, logical operations, output selections such as via a multiplexer, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal oxide semiconductor FET (MOSFET), n-type, p-type, drain-extended, natural, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A method, comprising:
   receiving, at a circuit, data via an idle differential signal line;
   performing a squelch detection on the differential signal line;

determining a value of a common mode voltage (Vcm) with reference to a reference voltage (VREF) by performing a comparison; and verifying a result of the squelch detection with a result of the comparison.

2. The method of claim 1, wherein VREF has a value greater than an ideal Vcm of high-speed differential communication and less than a value indicative of a logical high value of a single-ended signal.

3. The method of claim 2, further comprising receiving a skewed single-ended signal pair having rising edge transitions, wherein the result of the squelch detection identifies the skewed single-ended signal pair as high-speed differential communication, and wherein the result of the comparison disproves the result of the squelch detection by indicating that Vcm exceeds VREF.

4. The method of claim 1, further comprising receiving a differential input signal, wherein the result of the squelch detection identifies the differential input signal as high-speed differential communication, and wherein the result of the comparison verifies the result of the squelch detection by indicating that Vcm is not greater than VREF.

* * * * *